Patented Feb. 25, 1936

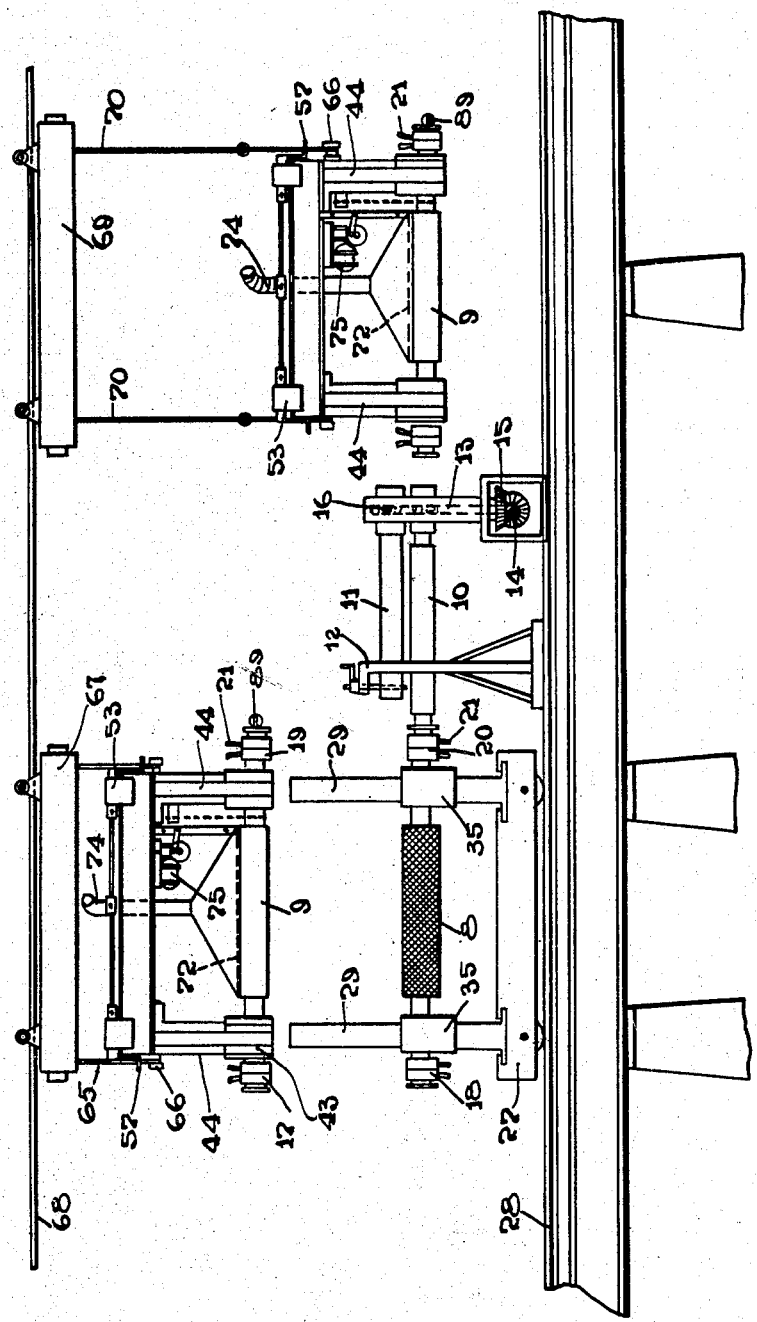

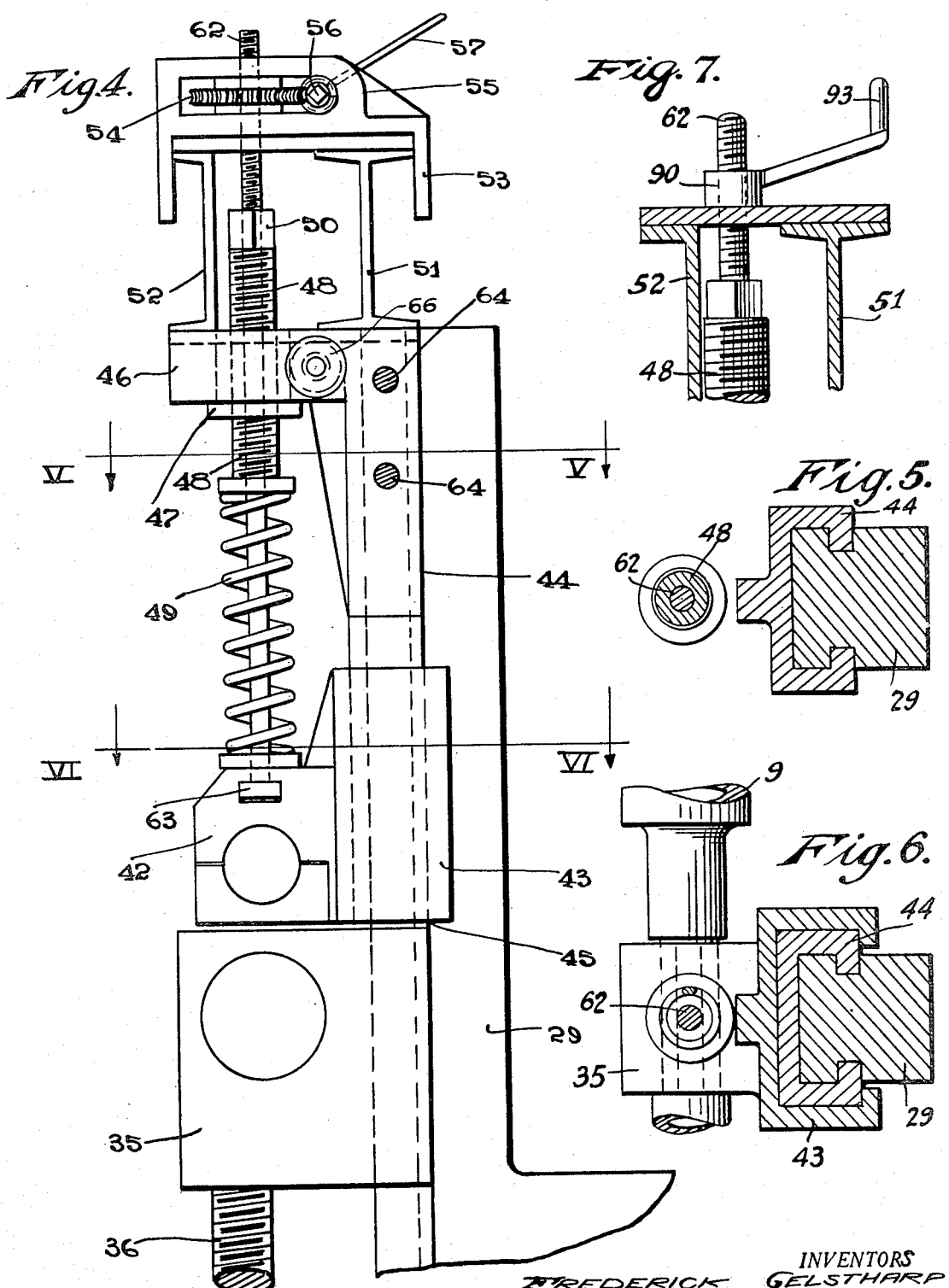

2,032,009

UNITED STATES PATENT OFFICE 2,032,009

APPARATUS FOR MAKING FLAT GLASS

Frederick Gelstharp, Tarentum, and John H. Fox, Pittsburgh, Pa., assignors to Pittsburgh Plate Glass Company, a corporation of Pennsylvania Application August 14, 1934, Serial No. 739,724

8 Claims. (Cl. 49—33)

Figure 1:
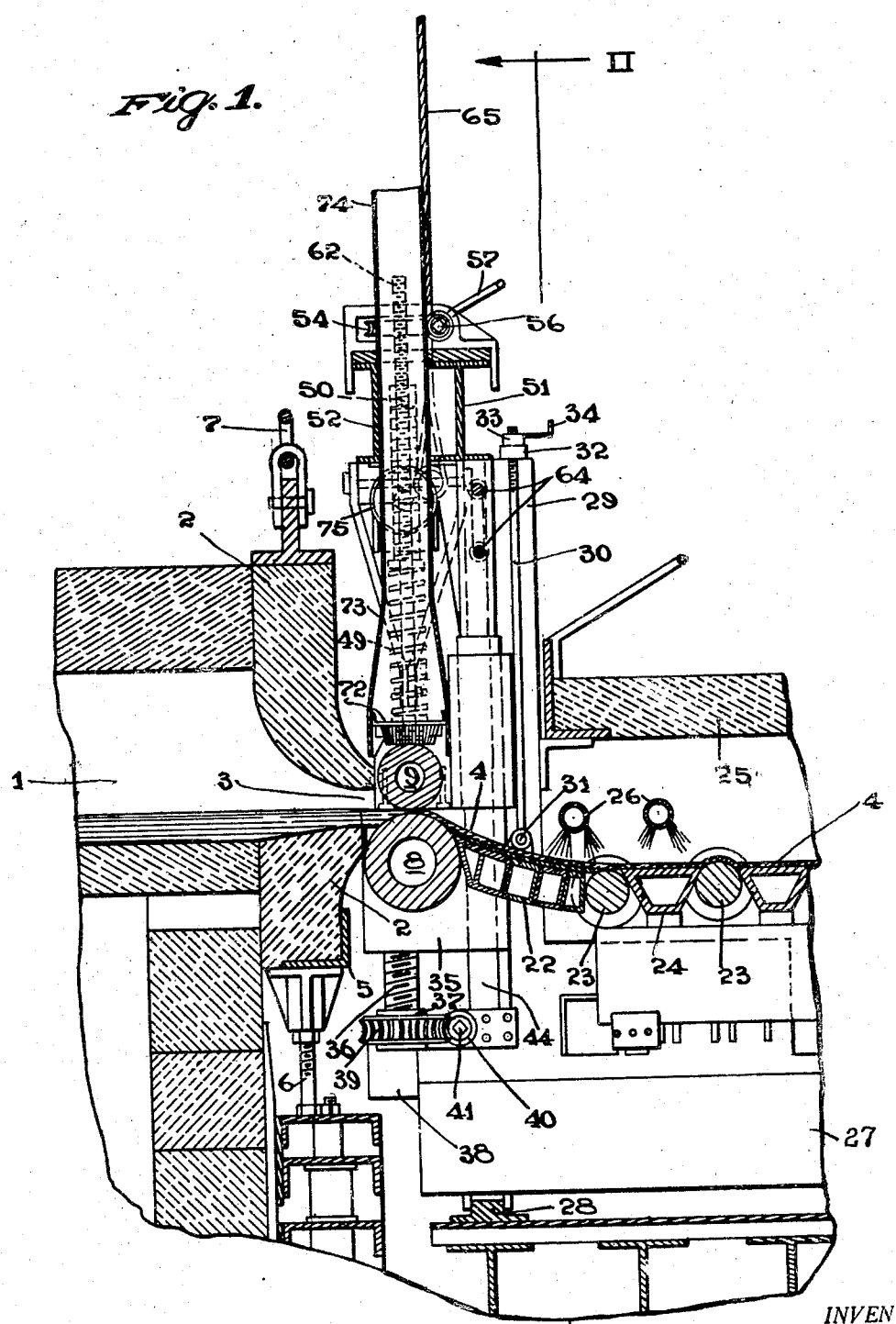
Figure 2:
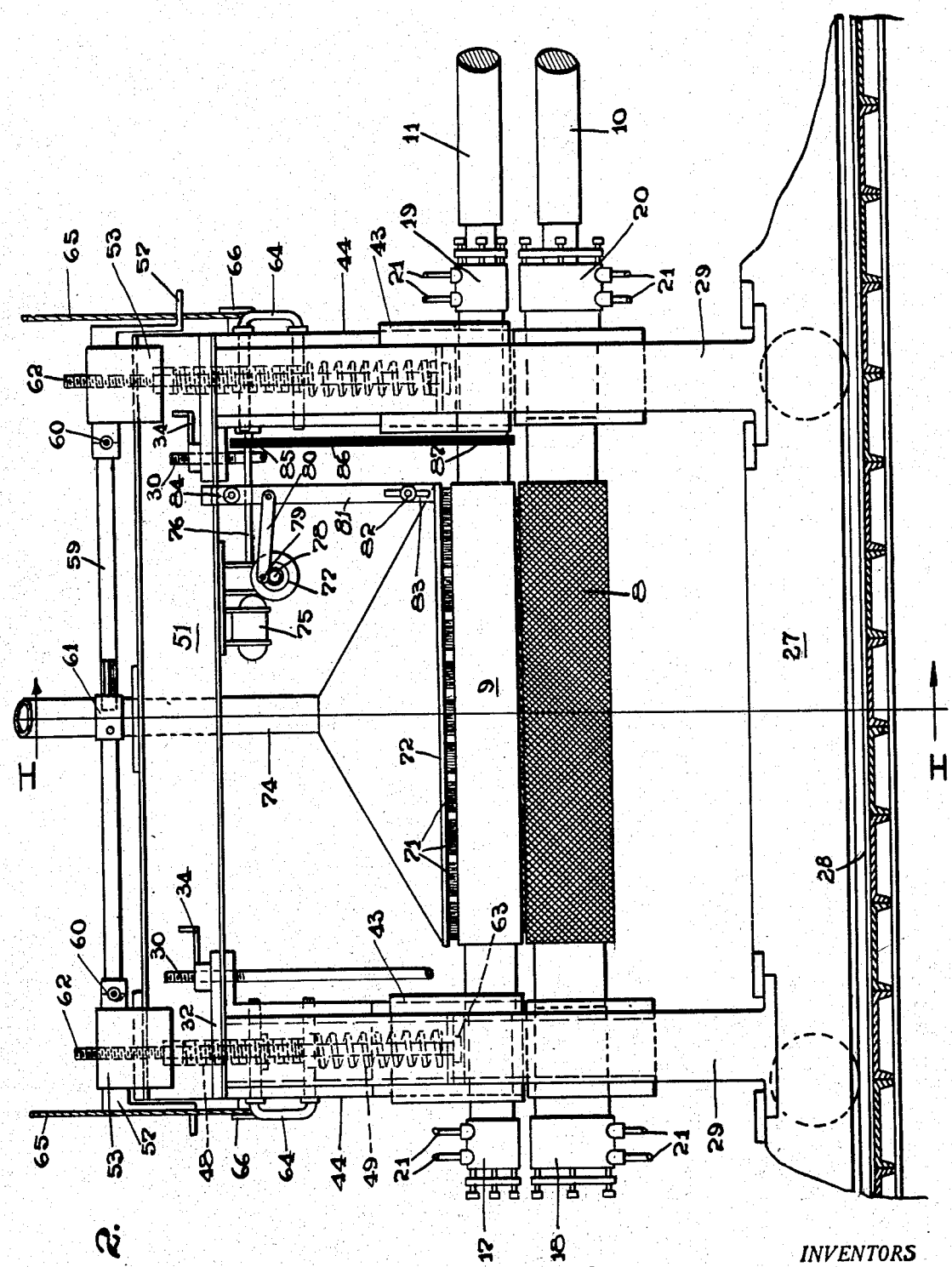

The invention relates to apparatus for making flat glass continuously and particularly flat glass having a fire polish on its upper surface so that only the lower surface has to be ground and polished in order to produce a product which, for some purposes, may be substituted for plate glass. One purpose for which this glass is particularly applicable is in the manufacture of safety glass, the fire polished surface of the glass being placed next to the reinforcing sheet, so that the finished product shows only the polished plate surfaces. One object of the invention is the provision of an improved apparatus for producing a product which is flat and of uniform thickness and has an upper fire polished surface in which the wavy or battered appearance, characteristic of a fire polished flat glass, is avoided to a considerable degree. A further object is the provision of an improved construction which permits the quick replacement of the upper sizing roll which determines the thickness of the sheet without interrupting the continued formation of the sheet. A still further object is the provision of improved means for keeping the upper sizing roll clean and in a highly polished condition and for cooling such roll so that overheating and warping is avoided. Certain embodiments of the invention are illustrated in the accompanying drawings, wherein:

Figure 1 is a vertical section on the line I—I of Fig. 2. Fig. 2 is a section on the line II—II of Fig. 1. Fig. 3 is a diagrammatic front elevation on the line II—II of Fig. 1 showing the apparatus for removing the top sizing roll and replacing it by another roll without interrupting the operation of the apparatus. Fig. 4 is a detail side elevation view. Figs. 5 and 6 are sections on the lines V—V and VI—VI respectively of Fig. 4. And Fig. 7 is a detail sectional view illustrating a modification.

Referring to the drawings, 1 is the outlet end of a melting tank containing a molten body of glass, and provided at its front end with a wall 2 having a slot 3 therethrough to permit of the continuous withdrawal of glass from the tank to form the sheet 4. The front wall 2 is supported in a metal frame 5 upon jacks 6 whereby the level of the slot may be regulated. The frame has connected to its upper end a chain 7 leading to an overhead crane to permit of the ready replacement of the front wall.

The thickness of the glass sheet is regulated by the sizing rolls 8 and 9. These sizing rolls are driven from tumbler shafts 10 and 11 which are releasably coupled to the ends of the rolls in the usual way and are supported in the frame members 12 and 13 (Fig. 3). The tumbler shafts are driven from a drive shaft 14 through the gears 15 and suitable reduction gearing in the casing 16 which is well known in the art and requires no detailed description. The sizing rolls are provided at their ends with suitable swivels 17, 18, 19 and 20 connected to water pipes 21 so that a cooling flow of water may be passed through the rolls in the usual way. The glass sheet as it emerges from the sizing rolls passes over a hollow apron 22 made in sections and suitably cooled. It then passes over a runway made up of alternate rolls 23 and apron sections 24 to a roller leer (not shown) through which the sheet is carried and annealed, being cut into sections at the outlet end thereof. A cover 25 is positioned over the runway to keep the glass from cooling too rapidly, and burner pipes 26 are arranged transversely above the glass sheet in order to supply additional heat, this being desirable in some cases in order to improve the fire finish upon the upper surfaces of the sheet.

The sizing rolls and runway are preferably mounted upon a truck or roll car 27 carried by the rails 28, which permits this part of the apparatus to be removed from the front of the tank for replacement or repair of parts carried by the car, and to give access to the front end of the tank when occasion requires. The roll car has rigidly supported thereon a pair of uprights or standards 29 adjacent to the ends of the sizing rolls which act as guides for the bearings in which the rolls are mounted, as later described. The apron 22 is adjustably supported upon these standards by means of a pair of rods 30 pivoted to the apron at 31 and extending through brackets 32 at the upper ends of the standards. The upper ends of the rods are threaded as illustrated, and carry the nuts 33 having the handles 34 by means of which the apron may be adjusted up and down to correspond to the adjustment of the sizing rolls.

The lower sizing roll 8 is carried in a pair of bearings 35 whose right hand sides (Fig. 1) are slidably engaged with the guides 36 on the standards 29. The bearings are adjustable vertically by means of the threaded shafts 36 bearing at their upper ends upon the bottoms of the bearings and extending through the nuts 37 supported upon the body portion 38 of the roll car. These nuts 37 are provided with worm wheels 39 engaged by worms 40 carried upon a shaft 41 and this shaft is provided with a crank (not shown)

whereby the nuts 37 may be rotated to adjust the bearings 35 to the proper height.

The upper sizing roll 9 is mounted in a pair of bearings 42 having guide portions 43 which are indirectly mounted upon the standards 29 for vertical adjustment and to permit of the removal of the bearings and the roll from the apparatus in an expeditious manner when it becomes necessary to remove the roll and substitute another one. Mounted directly upon the standards 29 are a pair of hollow posts or slide members 44 whose ends rest at 45 upon suitable shoulders upon the standards and whose upper ends are provided with laterally extending abutments or flanges 46 which project above the bearings 42 in opposition thereto. The members 44 act as guides for the bearing extensions 43, heretofore referred to as being mounted indirectly upon the standards 29.

The abutments 46 carry nuts 47 through which are threaded the hollow screws 48, and between the lower end of these screws and the bearing blocks 42 are interposed the coil springs 49. This provides a means for yieldingly pressing the upper sizing roll 9 downward to regulate its pressure upon the glass being formed between such roll and the lower sizing roll 8. In order to rotate the screws 48, the upper ends thereof are squared, as indicated at 50, to provide for the application of a wrench for rotating the screws, and thus adjusting the tension of the springs 49. Extending across the upper ends of the posts or slide members 44 and secured thereto so as to tie such members together is an I-beam 51. The abutments 46 are similarly connected by means of a channel 52. Seated upon the I-beam and channel at each end thereof for free upward movement is a U-shaped block 53, in each of which is mounted a worm wheel 54 and a worm 55 meshing therewith. The worms 55 are carried by stub shafts 56 provided at their ends with the crank arms 57 and such stub shafts are connected together by means of the shaft sections 58 and 59, the outer ends of such sections having the universal joint connections 60 with the stub shafts. The inner ends of the shaft sections 58 and 59 are connected together by the sleeve 61 which is pinned to the shaft section 58 and has a splined connection with the shaft section 57. Threaded through the worm wheels 54 are the shafts 62 which extend down through the hollow shafts 48 and are provided at their lower ends with heads 63 engaging T-slots in the bearing blocks 42. This provides a means for positively moving the bearing blocks upward so as to regulate the space between the sizing rolls 8 and 9. Since the blocks 53 are free to move vertically upward with respect to the members 51 and 52, upon which they are mounted, the arrangement as above described permits the roll 9 to be moved upward against the tension of the springs 49 in case a body of hard glass must pass between the sizing rolls, which is an emergency that must be met at intervals. The connection of the stub shafts 55 by the shaft sections 58 and 59 in conjunction with the universal joints 60, 60 and the splined connection 61, permits independent upward movement at the ends of the roll 9 so that such roll may tilt when occasion arises.

During the operation of the apparatus, the hollow posts or guide members 44 are held against upward movement by means of the U-shaped indexing bolts 64, 64 which pass through recesses in the posts 44 and in the fixed standards 29. The arrangement as above described permits of the ready removal of the upper roll 9, and its replacement by another roll without interrupting the operation of the apparatus when occasion arises for such replacement. At this time, the indexing bolts 64 are removed and the entire apparatus which supports the roll 9, including the posts 44 and bearing blocks 42, is moved vertically by means of a pair of cables 65 attached at their lower ends to trunnions 66 projecting laterally from the upper ends of the posts 44, and at their upper ends secured to the crane 67 shown in Fig. 3, such crane being mounted upon a trolley beam 68. When the apparatus is lifted to the position indicated in Fig. 3, it is moved to the left along the beam 68 so that it is out of the way. Also mounted upon the beam 68 is a second crane 69, which supports upon the cables 70 a duplicate throughout of the apparatus which is being removed on the crane 67. The crane raises this apparatus to a point above the level of the top of the standards 29, after which it is moved to the right to a position over such standards. It is now lowered so that the standards engage the guide posts 44 and is moved down to operative position, at which time the indexing bolts 64 are inserted, thus locking the posts 44 in position. This replacement operation can be accomplished in a few minutes so that there is no interruption to the formation of the sheet, and the only loss which occurs is the section of the sheet which has passed the roll 8 during the shifting operation.

The roll 9 may be of carbon having a very smooth surface, but it is preferably of some refractory metal composition, such as a nickel chromium alloy which will take a high polish. This smooth finish upon the upper roll is desirable in order to prevent marring of the upper surface of the glass sheet which is formed. In the operation of apparatus of this kind, a certain amount of alkaline dust from the tank collects upon the surface of the upper roll, and provision is made in the present apparatus for continuously removing this dust and for polishing the roll. This is preferably accomplished by the use of a series of polishing and cleaning pads 71 mounted on a plate 72 carried in the lower portion of the hood 73. These polishing pads may be of asbestos, soap stone, fine wire, or other suitable material, and the hood is preferably mounted for movement longitudinally of the roll in order to give a better distribution of the cleaning and polishing action upon the roll. In order to permit of this movement of the hood, it is supported upon a flexible pipe 74 which extends between and is secured to the members 51 and 52. The outer end of this pipe is connected to a suitable exhausting apparatus, which is not shown, so that a flow of air occurs upward between the periphery of the roll and the lower edges of the hood. This is desirable in order to carry away any dust or dirt incident to the polishing action of the brushes or pads and because it supplies a cooling flow of air upward over the outer surface of the roll 9, thus augmenting the cooling action of the fluid which is circulated through the center of the roll. In order to reciprocate the hood and brushes carried thereby, a motor 75 (Fig. 2) is employed carried by the lower side of the I-beam 51. This motor drives a shaft 76 which operates through reducing gearing in the casing 77 to rotate a transversely extending shaft 78. The shaft 78 carries a crank 79 which operates the connecting rod 80 connected at its end to the bar 81. This bar 81 has a pin and slot connection 82 at its lower end with the lug 83 carried by the hood, and at its upper end is pivoted to a bracket 84 carried by the beam 51. The shaft 76 has at its outer end a one-way roller clutch 85, one of the parts of which is provided with a sprocket, and over this sprocket passes a chain 86 which extends at its lower end around a sprocket 87 carried by the roll 3. This provides an alternative method for rotating the shaft 76 and swinging the bar 81 when current is not supplied to the motor 75. This gives a means for oscillating the arm 81 at a slower speed than that produced by the motor drive, which is desirable under certain conditions.

The lower roll 8 has its surface uniformly roughened, preferably by knurling, as indicated in Fig. 2. This gives the lower side of the glass sheet a correspondingly roughened surface and has been found to have the effect of improving the upper surface of the glass by reducing the wavy effect characteristic of a fire-finished surface. One of the apron rolls 23 is preferably positioned, as indicated in Fig. 1, with its periphery slightly above the level of the other apron rolls 23 and the platen members 24, which has been found to reduce the size of any longitudinal flutes remaining in the glass at this point, thus giving a somewhat flatter sheet and consequently a better upper surface than would otherwise be the case.

In operating the apparatus, the speed of rolling is preferably relatively high, as compared with the speed at which plate glass is formed that is to be ground and polished on both sides. This speed of rolling preferably ranges from 120 to 150 inches per minute. This high speed combined with the use of a small upper sizing roll, such as the roll 9, which has a minimum area of contact with the upper surface of the sheet (in performing the sizing function) results in a sheet whose upper surface is relatively free from blemish and has a good fire polish. Any marring effect on such surface incident to the contact of the upper roll therewith is reduced to a minimum due to the highly polished condition to which the upper roll is maintained and to the fact that the residual heat in the glass after it passes the sizing rolls is sufficient to largely remove any traces of roll contact. The burners 26, 26 are of service in this connection since they add to the heat in the glass and tend to improve the fire finish, although in some cases this additional heat is not required. In connection with the replacement of the upper roll apparatus as heretofore described, it will be understood that the tumbler shafts have a splined connection with the end of the upper roll 8, as indicated at 89 (Fig. 3), to permit of the ready disconnection of the shaft with the roll.

Fig. 7 illustrates a modification in which a different means is shown for raising and lowering the shaft 62. Instead of the use of the worm wheel and worm 54, 56, as shown in Figs. 1 and 4, for accomplishing this function, each of the screws is provided with a nut 90 having a handle 92 whereby the shaft may be raised and lowered to secure the desired adjustment.

What we claim is:

1. In combination with a glass melting tank having an outlet and a lower driven sizing roll over which the glass is delivered in a continuous sheet, an upper driven sizing roll in opposition to the lower roll, upright standards at the ends of the rolls, bearings for the upper roll mounted on the standards and removable therefrom by vertical movement upward, posts guided for vertical movement on the standards with abutments lying above the bearings and also removable by vertical movement upward, springs between the abutments and the bearings, adjustable means carried by the abutments for compressing the springs, means for releasably locking the posts to the standards, and means supported on the posts for adjusting the bearing blocks upward to regulate the space between the rolls.

2. In combination with a glass melting tank having an outlet and a lower driven sizing roll over which the glass is delivered in a continuous sheet, an upper driven sizing roll in opposition to the lower roll, upright standards at the ends of the rolls, bearings for the upper roll mounted on the standards and removable therefrom by vertical movement upward, posts guided for vertical movement on the standards with abutments lying above the bearings and also removable by vertical movement upward, springs between the abutments and the bearings, screw means carried by the abutments for compressing the springs, means for releasably locking the posts to the standards, and screw means carried by the posts for adjusting the bearing blocks upward to regulate the space between the rolls.

3. In combination with a glass melting tank having an outlet and a lower driven sizing roll over which the glass is delivered in a continuous sheet, an upper driven sizing roll in opposition to the lower roll, upright standards at the ends of the rolls, bearings for the upper roll mounted on the standards and removable therefrom by vertical movement upward, posts guided for vertical movement on the standards with abutments lying above the bearings and also removable by vertical movement upward, springs between the abutments and the bearings, hollow screws carried by the abutments for compressing the springs, means for releasably locking the posts to the standards, and screws supported on the posts and extending through the hollow screws for adjusting the bearing blocks upward to regulate the space between the rolls.

4. In combination with a glass melting tank having an outlet and a lower driven sizing roll over which the glass is delivered in a continuous sheet, an upper driven sizing roll in opposition to the lower roll, upright standards at the ends of the rolls, provided with longitudinally extending guides, posts slidably mounted on the guides and provided with abutments projecting over the roll ends, bearings for the upper roll slidably mounted on the posts for movement longitudinally thereof, springs between the abutments and the bearings, screw means carried by the abutments for compressing the springs, means for releasably locking the posts against upward movement on the standards, and screw means supported on the posts above the abutments and engaging the bearings for adjusting the bearings upward to regulate the space between the rolls.

5. In combination with a glass melting tank having an outlet and a lower driven sizing roll over which the glass is delivered in a continuous sheet, an upper driven sizing roll in opposition to the lower roll, a hood fitting down over the upper roll partially enclosing it with its lower edges spaced away from its periphery to provide air admission slots, and means for exhausting the air from the hood.

6. In combination with a glass melting tank having an outlet and a lower driven sizing roll over which the glass is delivered in a continuous sheet, an upper driven sizing roll in opposition to the lower roll, a hood fitting down over the upper roll partially enclosing it with its lower edges spaced away from the periphery to provide air admission slots, means for exhausting the air from the hood, and polishing means in the hood engaging the surface of the upper roll.

7. In combination with a glass melting tank having an outlet and a lower driven sizing roll over which the glass is delivered in a continuous sheet, an upper driven sizing roll in opposition to the lower roll, a hood fitting down over the upper roll partially enclosing it with its lower edges spaced away from its periphery to provide air admission slots, means for exhausting the air from the hood, polishing means carried by the hood and engaging the surface of the upper roll, and power means for reciprocating the hood longitudinally of such roll.

8. In combination with a glass melting tank having an outlet and a lower driven sizing roll over which the glass is delivered in molten condition direct from the tank in a continuous sheet, said lower roll having its glass engaging surface provided throughout with a fine uniform pattern, and an upper driven sizing roll and having its surface polished.

FREDERICK GELSTHARP.
JOHN H. FOX.